(12) United States Patent
Kutsuna

(10) Patent No.: US 12,245,547 B2
(45) Date of Patent: Mar. 11, 2025

(54) LAWN MOWER FOR COLLECTING HEAVY GRASS AND DISCHARGING LIGHT GRASS

(71) Applicant: Makita Corporation, Anjo (JP)

(72) Inventor: Tomoyuki Kutsuna, Anjo (JP)

(73) Assignee: MAKITA CORPORATION, Anjo (JP)

( * ) Notice: Subject to any disclaimer, the term of this patent is extended or adjusted under 35 U.S.C. 154(b) by 655 days.

(21) Appl. No.: 17/457,984

(22) Filed: Dec. 7, 2021

(65) Prior Publication Data
US 2022/0174869 A1    Jun. 9, 2022

(30) Foreign Application Priority Data
Dec. 9, 2020  (JP) .................................. 2020-204003

(51) Int. Cl.
*A01D 34/71* (2006.01)
*A01D 43/063* (2006.01)
*A01D 101/00* (2006.01)

(52) U.S. Cl.
CPC ........... *A01D 34/71* (2013.01); *A01D 43/063* (2013.01); *A01D 2101/00* (2013.01)

(58) Field of Classification Search
CPC ............................... A01D 34/71; A01D 43/063
See application file for complete search history.

(56) References Cited

U.S. PATENT DOCUMENTS

| | | | | |
|---|---|---|---|---|
| 3,006,128 A * | 10/1961 | Weiland | ................ | A01D 43/063 56/16.6 |
| 3,188,787 A * | 6/1965 | Weiland | ................ | A01D 43/063 56/16.5 |
| 3,195,297 A * | 7/1965 | Weiland | ................ | A01D 34/63 56/16.5 |
| 3,367,091 A * | 2/1968 | Weiland | ................ | A01D 34/71 56/16.6 |
| 3,423,917 A * | 1/1969 | Victor | ................ | A01D 43/063 56/202 |
| 3,521,436 A * | 7/1970 | Venzke | ................ | A01D 43/063 56/202 |
| 4,080,774 A * | 3/1978 | Knight | ................ | A01D 43/063 56/199 |
| 4,259,832 A * | 4/1981 | DuRay | ................ | A01D 43/063 56/202 |
| 4,310,998 A * | 1/1982 | Cuba | ................ | A01D 43/07 15/340.1 |
| 4,426,830 A * | 1/1984 | Tackett | ................ | A01D 43/077 56/16.6 |

(Continued)

FOREIGN PATENT DOCUMENTS

JP       2004-000127 A     1/2004

*Primary Examiner* — Thomas B Will
*Assistant Examiner* — Julia C Tran
(74) *Attorney, Agent, or Firm* — Sughrue Mion, PLLC

(57) ABSTRACT

A lawn mower may include: a blade configured to cut grass; a grass collection unit configured to collect the grass cut by the blade; and a fan configured to generate an air flow that blows the grass cut by the blade toward the grass collection unit. The grass may include heavy grass cut long by the blade and light grass cut short by the blade. Among the heavy grass and the light grass having entered the grass collection unit, the grass collection unit may be configured to collect the heavy grass and discharge the light grass out of the grass collection unit.

12 Claims, 11 Drawing Sheets

(56) References Cited

U.S. PATENT DOCUMENTS

| | | | | |
|---|---|---|---|---|
| 4,848,070 | A | * | 7/1989 | Berglund ............. A01D 43/063 56/16.6 |
| 4,924,664 | A | * | 5/1990 | Hicks ................... A01D 43/063 56/16.6 |
| 4,970,852 | A | * | 11/1990 | Check .................. A01D 43/063 56/201 |
| 5,076,045 | A | * | 12/1991 | McClung, IV .... A01D 43/0635 56/202 |
| 5,678,399 | A | * | 10/1997 | Baron ................ A01D 43/0633 56/16.6 |
| 2003/0182916 | A1 | | 10/2003 | Iida et al. |
| 2005/0076629 | A1 | | 4/2005 | Iida et al. |
| 2005/0284121 | A1 | * | 12/2005 | Iida ...................... A01D 43/063 56/202 |
| 2014/0075899 | A1 | * | 3/2014 | Yamamoto ............. A01D 34/71 56/2 |
| 2016/0014962 | A1 | * | 1/2016 | Hoppel ............. A01D 43/0635 56/16.8 |

* cited by examiner

LAWN MOWER FOR COLLECTING HEAVY GRASS AND DISCHARGING LIGHT GRASS

CROSS-REFERENCE TO RELATED APPLICATION

This application claims priority to Japanese Patent Application No. 2020-204003 filed on Dec. 9, 2020, the entire contents of which are hereby incorporated by reference into the present application.

TECHNICAL FIELD

This disclosure herein relates to a lawn mower.

BACKGROUND

Japanese Patent Application Publication No. 2004-000127 describes a lawn mower. The lawn mower includes a blade configured to cut grass, a grass collection unit configured to collect the grass cut by the blade, a duct through which the grass cut by the blade flows toward the grass collection unit, and a shutter configured to adjust an opening area of a passage opening of the duct. By the shutter adjusting the opening area of the passage opening of the duct, a part of the grass cut by the blade is collected to the grass collection unit through the passage opening of the duct, while the remaining grass collides into the shutter and is scattered on ground.

SUMMARY

The grass cut by the blade includes heavy grass that is cut long and light grass that is cut short. When the heavy grass and the light grass are collected altogether in the grass collection unit, a worker needs to frequently perform work to throw out the grass collected in the grass collection unit, and this decreases efficiency of grass-cutting work. If the heavy grass alone can be collected in the grass collection unit while the light grass is discharged onto ground, frequency of the work to throw out the grass collected in the grass collection unit can be reduced. With the lawn mower of Japanese Patent Application No. 2004-000127, the shutter merely adjusts the opening area of the passage opening of the duct, thus it cannot separate grass into heavy grass and light grass. The disclosure herein discloses art that enables separation of glass into heavy grass cut long and light grass cut short, and collect the heavy grass and discharge the light grass.

The present disclosure discloses a lawn mower. The lawn mower may comprise a blade configured to cut grass; a grass collection unit configured to collect the grass cut by the blade; and a fan configured to generate an air flow that blows the grass cut by the blade toward the grass collection unit. The grass may include heavy grass cut long by the blade and light grass cut short by the blade. Among the heavy grass and the light grass having entered the grass collection unit, the grass collection unit may be configured to collect the heavy grass and discharge the light grass out of the grass collection unit.

In the above configuration, firstly, both the heavy grass and the light grass cut by the blade enter the grass collection unit. After that, only the heavy grass is collected in the grass collection unit, while the light grass flows within the grass collection unit and is thereafter discharged out of the grass collection unit. Due to this, the grass can be separated into the heavy grass and the light grass, as a result of which the heavy grass can be collected and the light grass can be discharged.

DETAILED DESCRIPTION

Figure 1:
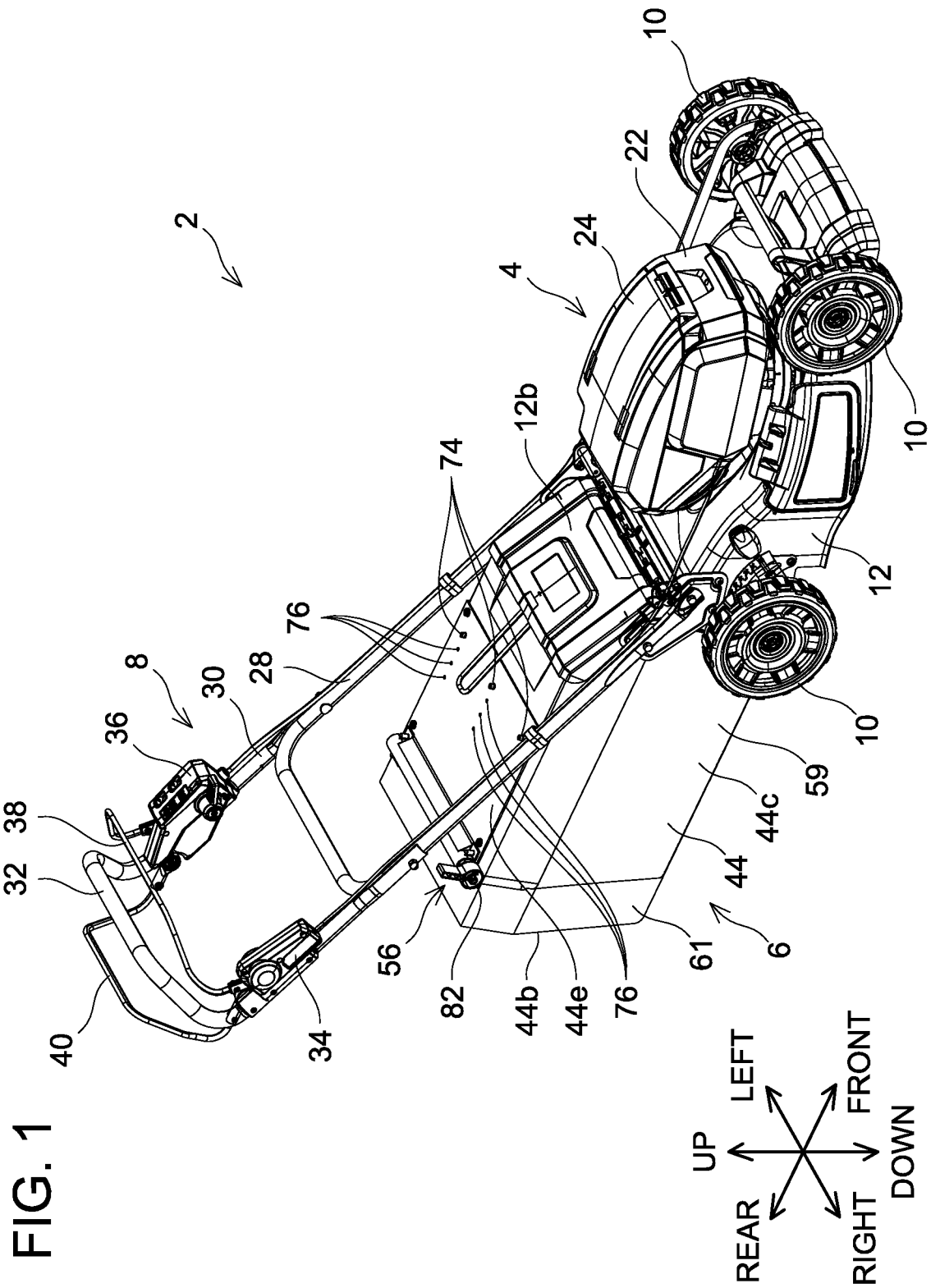
FIG. 1 is a perspective view showing an outer appearance of a lawn mower 2 of a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved lawn mowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the grass collection unit may comprise: a grass collection part configured to collect the grass and comprising a collection inlet and a discharge outlet; and an adjustment mechanism disposed inside the grass collection part and configured to adjust the air flow having entered the grass collection part from the collection inlet. By the adjustment mechanism adjusting the air flow having entered the grass collection part from the collection inlet, the heavy grass may be collected in the grass collection part and the light grass is discharged out of the grass collection part from the discharge outlet.

In the above configuration, by adjusting the air flow using the adjustment mechanism, the heavy grass can be collected in the grass collection part while the light grass is discharged out of the grass collection part through the discharge outlet by using a weight difference between the light grass and the heavy grass. Due to this, the grass can be separated into the heavy grass and the light grass, and further, the heavy grass can be collected while the light grass is discharged.

In one or more embodiments, the adjustment mechanism may comprise a velocity adjustment member. The velocity adjustment member may be configured to adjust velocity of the air flow from the collection inlet toward the discharge outlet by adjusting an opening area of the discharge outlet.

When the velocity of the air flow from the collection inlet toward the discharge outlet is decreased within the grass collection part, the light grass will flow to the discharge outlet along with the air flow, while the heavy grass is more likely to drop out from the air flow and be collected in the grass collection part. In the above configuration, by adjusting the opening area of the discharge outlet using the velocity adjustment member, the velocity of the air flow from the collection inlet toward the discharge outlet can be adjusted. Due to this, the grass can be separated into the heavy grass and the light grass, and further the heavy grass can be collected while the light grass is discharged.

In one or more embodiments, the velocity adjustment member may be pivotably supported by the grass collection part. The opening area of the discharge outlet may change as a pivot angle of the velocity adjustment member changes.

In the above configuration, the opening area of the discharge outlet can be adjusted with a simple configuration.

In one or more embodiments, the velocity adjustment member may be slidably supported by the grass collection part. The opening area of the discharge outlet may change as an amount of sliding of the velocity adjustment member changes.

In the above configuration, the opening area of the discharge outlet can be adjusted with a simple configuration.

In one or more embodiments, the adjustment mechanism may comprise a direction adjustment member. The direction adjustment member may be disposed between the collection inlet and the discharge outlet, and the direction adjustment member may be configured to adjust a direction of the air flow from the collection inlet toward the discharge outlet by disturbing the air flow from the collection inlet toward the discharge outlet.

When the air flow from the collection inlet toward the discharge outlet meander in the grass collection part, the light grass will flow to the discharge outlet along with the air flow, while the heavy grass is more likely to drop out from the air flow and be collected in the grass collection part. In the above configuration, the direction of the air flow from the collection inlet toward the discharge outlet can be adjusted by disturbing the air flow from the collection inlet toward the discharge outlet by using the direction adjustment member. Due to this, the grass can be separated into the heavy grass and the light grass, and further the heavy grass can be collected while the light grass is discharged.

In one or more embodiments, the direction adjustment member may be pivotably supported by the grass collection part. The direction of the air flow from the collection inlet toward the discharge outlet may change as a pivot angle of the direction adjustment member changes.

In the above configuration, the direction of the air flow from the collection inlet toward the discharge outlet can be adjusted with a simple configuration.

In one or more embodiments, the direction adjustment member may be supported by the grass collection part. The direction adjustment member may be configured such that a position of the direction adjustment member is adjustable with respect to a direction from the collection inlet toward the discharge outlet. The direction of the air flow from the collection inlet toward the discharge outlet may change as the position of the direction adjustment member changes.

In the above configuration, the direction of the air flow from the collection inlet toward the discharge outlet can be adjusted with a simple configuration.

In one or more embodiments, the lawn mower may further comprise a prime mover configured to rotate the blade and the fan.

In the above configuration, the blade and the fan are both driven by the same prime mover. The lawn mower can be made more compact as compared to a case where a prime mover for driving the blade and a prime mover for driving the fan are separately provided.

In one or more embodiments, the blade and the fan may share a rotation shaft.

In the above configuration, since the blade and the fan share the rotation shaft, the lawn mower can be made more compact as compared to a case where the rotation shaft of the blade and the rotation shaft of the fan are separately provided.

In one or more embodiments, the blade and the fan may be integrally formed.

In the above configuration, the number of components constituting the lawn mower can be reduced.

In one or more embodiments, the prime mover may be an electric motor.

In the above configuration, vibration and noise generated upon using the lawn mower can be reduced as compared to a case where the prime mover is an engine.

In one or more embodiments, the lawn mower may further comprise a battery pack configured to supply electric power to the prime mover.

When the lawn mower is configured to supply electric power from an external power source to the prime mover through a power cable, the power cable may interfere with grass-cutting work. In the above configuration, work efficiency in using the lawn mower can be improved.

First Embodiment

A lawn mower 2 of a first embodiment will be described with reference to FIGS. 1 to 7. As shown in FIG. 1, the lawn mower 2 includes a body unit 4, a grass collection unit 6, and a handle unit 8. The body unit 4 includes four wheels 10 that contact ground. The grass collection unit 6 is detachably attached to the rear end of the body unit 4. The handle unit 8 is connected to a rear upper portion of the body unit 4. When a worker stands behind the lawn mower 2 and pushes the same forward while holding an upper portion of the handle unit 8 with both hands, the wheels 10 rotate and the body unit 4 thereby moves forward along the ground. Hereinbelow, a direction along which the wheels 10 rotate and the body unit 4 moves along the ground will be termed a front-rear direction, a direction vertical to the ground will be termed an up-down direction, and a direction perpendicular to the front-rear direction and to the up-down direction will be termed a left-right direction.

Figure 2:
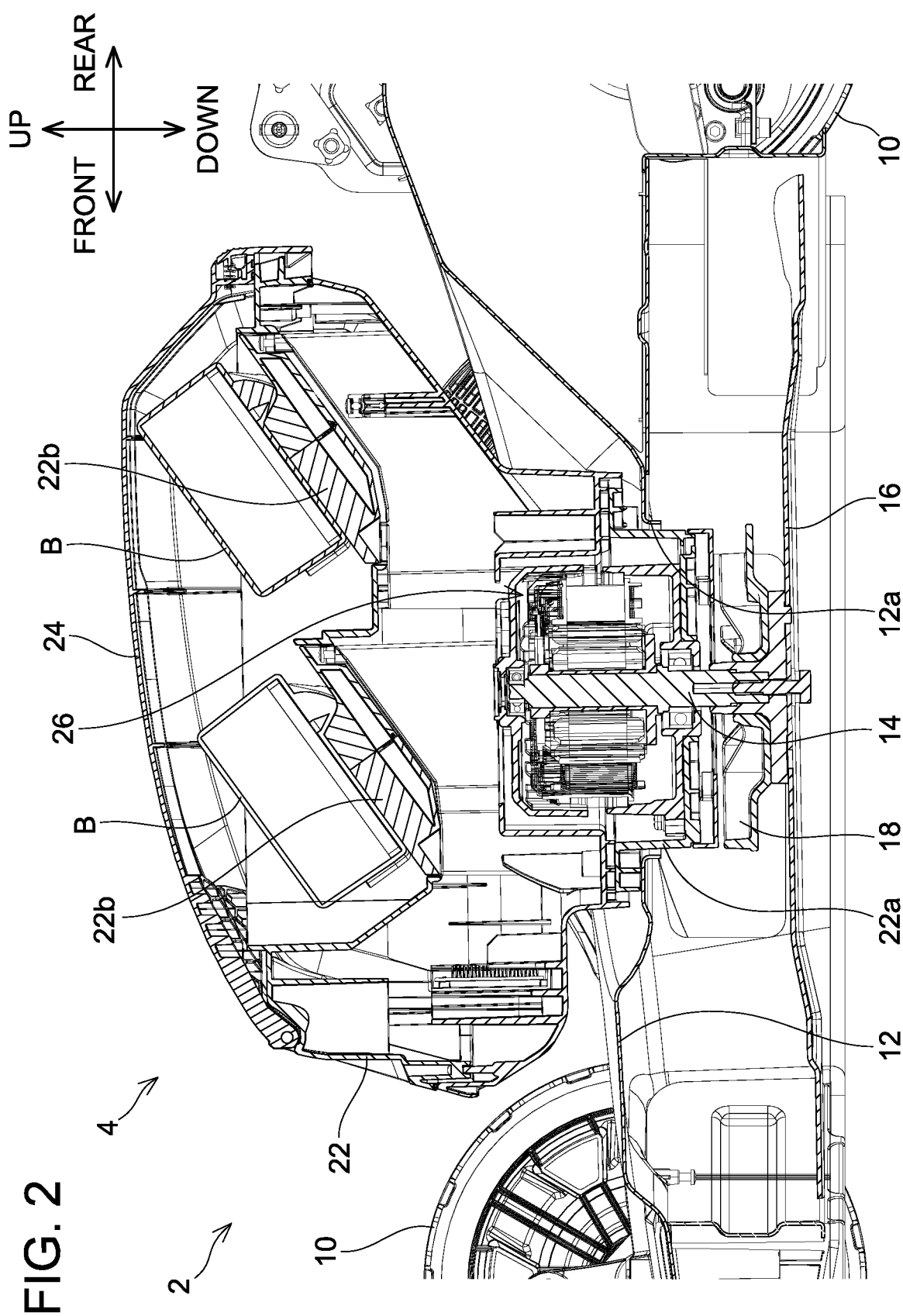
FIG. 2 is a vertical cross-sectional view of a portion of the lawn mower 2 of the first embodiment including a blade 16.
Figure 3:
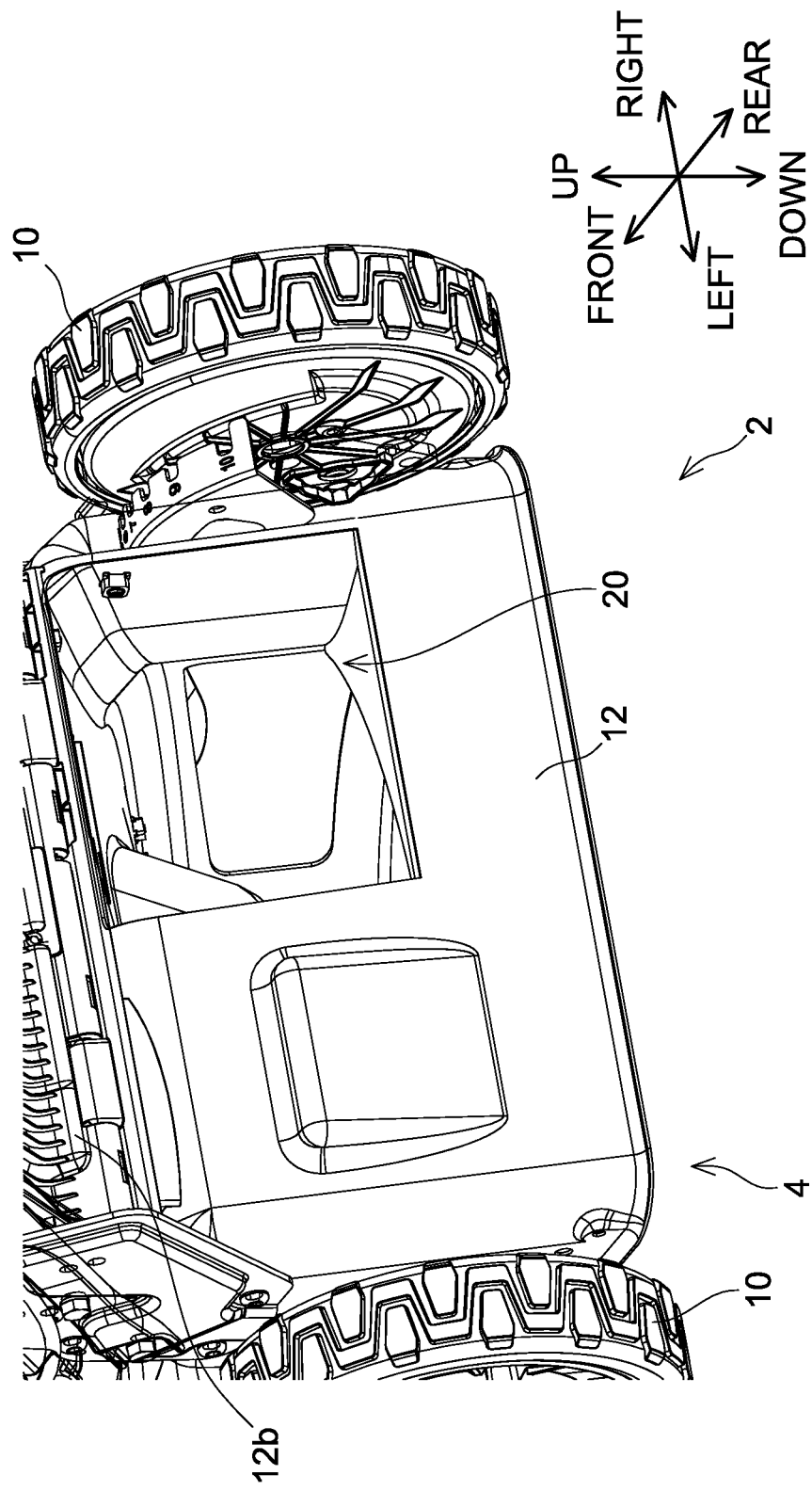
FIG. 3 is a perspective view of the lawn mower 2 of the first embodiment as viewed from the rear left side, specifically showing a portion of the lawn mower 2 including a duct 20 of a body unit 4 with a grass collection unit 6 detached.

As shown in FIG. 2, the body unit 4 includes a deck 12, a rotation shaft 14, a blade 16, a fan 18, a duct 20 (see FIG. 3), a cowl 22, a cover 24, a blade motor 26, battery packs B, and an ECU (not shown). A lower surface of the deck 12 opens toward the ground in a substantially cylindrical shape. A substantially circular opening 12a is defined in an upper surface of the deck 12. An internal space of the deck 12 communicates with the duct 20 that opens toward the rear side of the body unit 4. When the grass collection unit 6 (see FIG. 1) is attached to the rear end of the deck 12, the internal space of the deck 12 communicates with an internal space of the grass collection unit 6 through the duct 20. The rotation shaft 14 extends substantially vertically. The blade 16 and the fan 18 are disposed in the internal space of the deck 12. The blade 16 is fixed to the lower end of the rotation shaft 14. The blade 16 extends substantially horizontally from the rotation shaft 14. The fan 18 is fixed to the rotation shaft 14 at a position higher than the blade 16. The fan 18 is integrated with the blade 16. When the rotation shaft 14 rotates, the blade 16 rotates accordingly and grass on the ground is cut. Further, when the rotation shaft 14 rotates, the fan 18 rotates accordingly and an air flow from the opening of the deck 12 at its lower surface toward the duct 20 is generated within the internal space of the deck 12. Due to this, grass cut by the blade 16 is suctioned by the fan 18 and sent into the grass collection unit 6 through the duct 20.

The cowl 22 includes a skirt 22a that projects downward in a substantially circular shape. The cowl 22 is fixed to an upper surface side of the deck 12 such that the skirt 22a penetrates through the opening 12a of the deck 12. The openable cover 24 is attached to an upper portion of the cowl 22. The cowl 22 houses the blade motor 26, the battery packs B, and the ECU (not shown). The blade motor 26 may for example be a brushless motor. The blade motor 26 is configured to rotate the rotation shaft 14. The battery packs B are detachably attached to battery receptacles 22b of the cowl 22. The battery packs B may each include a secondary battery, such as a lithium-ion battery, for example. The battery packs B are disposed in a space defined by the cowl 22 and the cover 24. The ECU may for example include an inverter circuit (not shown) including a plurality of switching elements (not shown) and a control circuit (not shown) configured to control operations of the plurality of switching elements. The ECU is configured to control an operation of the blade motor 26 by controlling electric power supplied from the battery packs B to the blade motor 26, and also control an operation of a traction motor (not shown) for rotating the rear wheels 10.

As shown in FIG. 1, the handle unit 8 includes a lower frame 28, an upper frame 30, a right retaining part 34, a left retaining part 36, a switch lever 38, and a traction lever 40. The lower frame 28 is coupled to a rear upper portion of the deck 12. The lower frame 28 has a substantially U-shape that extends rearward and upward, bends, and further extends in the left-right direction. The upper frame 30 is coupled to a rear upper portion of the lower frame 28. The upper frame 30 has a substantially U-shape that extends rearward and upward, bends, further extends forward and upward, bends again and extends in the left-right direction. Hereinbelow, a portion of the upper frame 30 extending in the left-right direction will be termed a grip 32. The grip 32 is configured to be gripped by the worker. The right retaining part 34 is fixed to the upper frame 30 on the right side at a position lower than the grip 32. The left retaining part 36 is fixed to the upper frame 30 on the left side at a position lower than the grip 32. The switch lever 38 is disposed on a front lower side of the grip 32, and the traction lever 40 is disposed on a rear side of the grip 32. Each of the switch lever 38 and the traction lever 40 is supported by the right retaining part 34 and the left retaining part 36 so as to be pivotable about its pivot axis extending in the left-right direction. Each of the switch lever 38 and the traction lever 40 is biased by a spring (not shown) in a direction moving away from the grip 32. While gripping the grip 32, the worker can pull the switch lever 38 with finger(s) of a hand gripping the grip 32, and also pull the traction lever 40 with a remaining finger of the hand gripping the grip 32. When the switch lever 38 is pulled, the ECU rotates the blade motor 26. When the switch lever 38 returns to its initial position, the ECU stops rotation of the blade motor 26. When the traction lever 40 is pulled, the ECU rotates the traction motor. Due to this, the rear wheels 10 rotate, and the worker can move the lawn mower 2 without pushing the grip 32 forward. When the traction lever 40 returns to its initial position, the ECU stops rotation of the traction motor.

Figure 4:
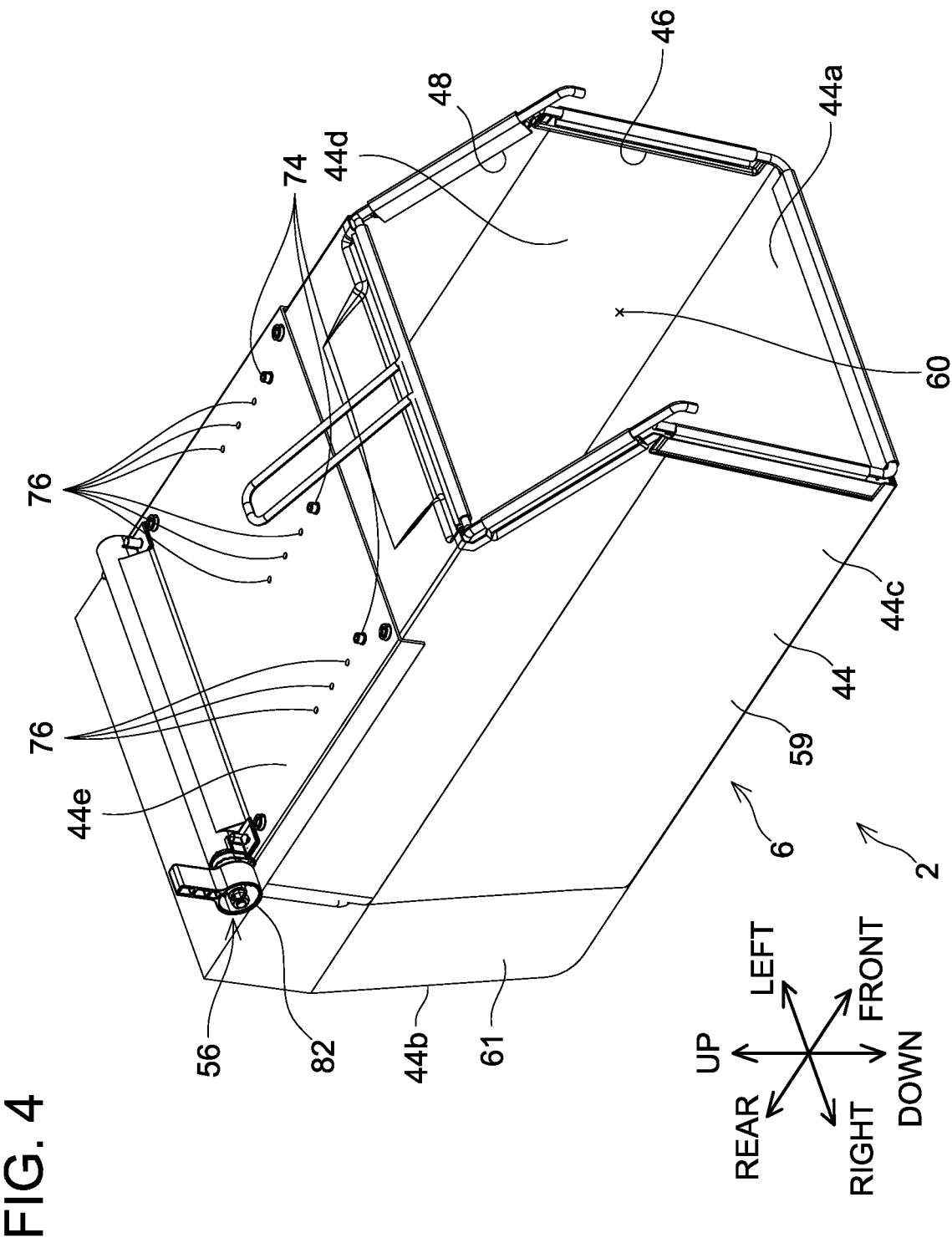
FIG. 4 is a perspective view showing an outer appearance of the grass collection unit 6 of the lawn mower 2 of the first embodiment.
Figure 5:
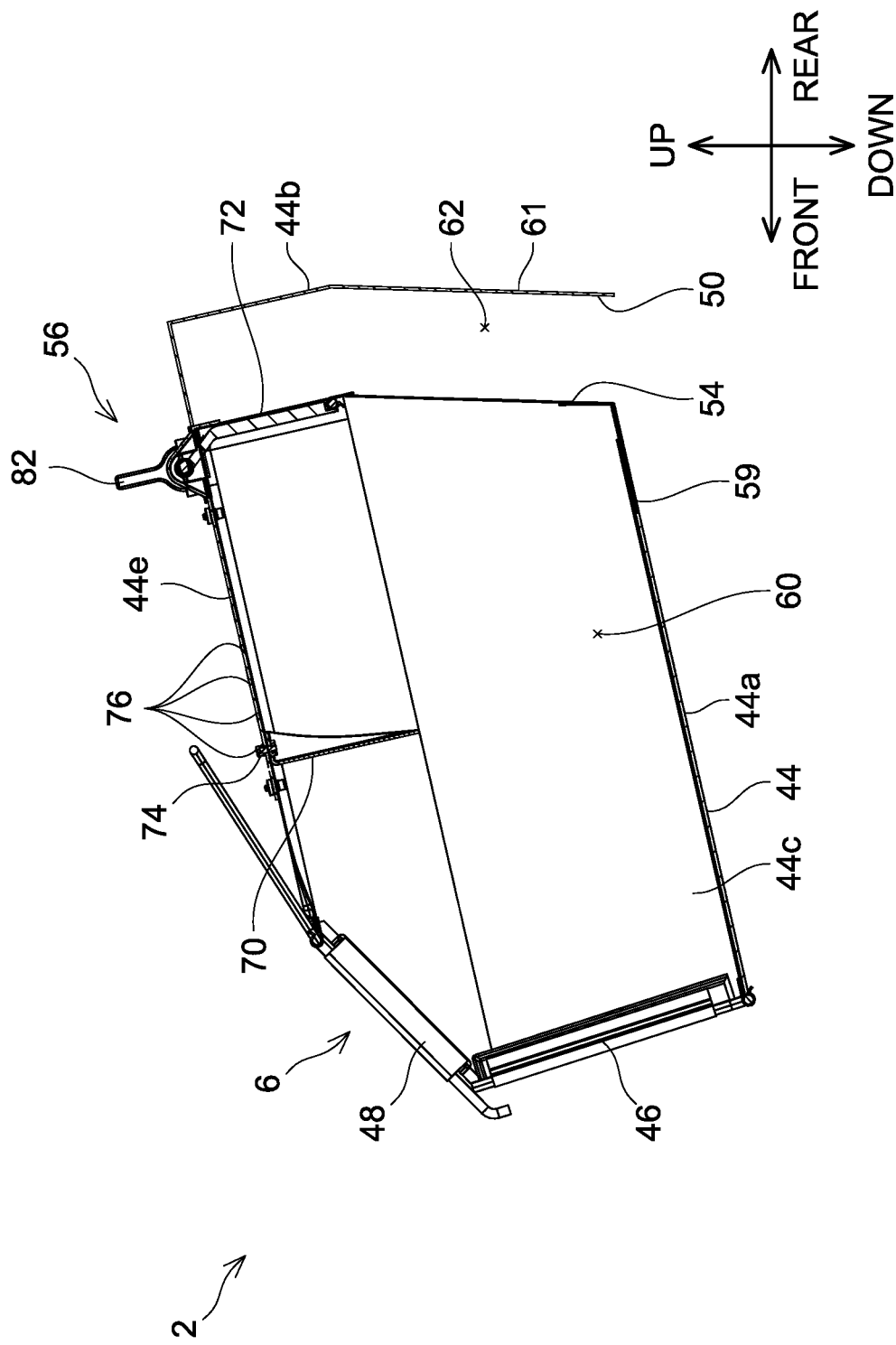
FIG. 5 is a vertical cross-sectional view of the grass collection unit 6 of the lawn mower 2 of the first embodiment, when a velocity adjustment member 72 is in a non-pivot state.

As shown in FIG. 4, the grass collection unit 6 includes a grass collection box 44. The grass collection box 44 includes an opening 46 that communicates with the duct 20 when the grass collection unit 6 is attached to the body unit 4, an opening 48 covered by the duct cover 12b of the body unit 4 (see FIG. 1), and an opening 50 (see FIG. 5). The opening 46 and the opening 48 are continuous with each other. The opening 46 is oriented frontward, and the opening 48 is oriented frontward and upward. Grass that is fed from the body unit 4 through the duct 20 enters into the grass collection box 44 through the opening 46. As shown in FIG. 1, the duct cover 12b is pivotably supported by the deck 12. The duct cover 12b is configured to pivot with respect to the deck 12 and cover the duct 20 from behind when the grass collection unit 6 is detached from the body unit 4. As shown in FIG. 5, the opening 50 is defined at the rear end of a lower wall 44a of the grass collection box 44. The opening 50 is disposed in front of a rear wall 44b of the grass collection box 44. Although not shown, the opening 50 extends from a right wall 44c to a left wall 44d of the grass collection box 44.

The grass collection unit 6 further includes an inner wall 54, an adjustment mechanism 56, and a lever 82. The inner wall 54 is integrated with the grass collection box 44. Although not shown, the inner wall 54 extends leftward from the right wall 44c and is connected to the left wall 44d. The inner wall 54 is disposed in front of the opening 50. That is, the inner wall 54 is disposed frontward of and separated from the rear wall 44b. The inner wall 54 extends from a lower wall 44a to an upper wall 44e of the grass collection box 44. The upper end of the inner wall 54 is separated from the upper wall 44e.

The inner wall 54 partitions the grass collection box 44 into a grass collection part 59 and a discharging part 61. The grass collection part 59 has a grass-collecting space 60 therein. The grass-collecting space 60 is defined by the inner wall 54, the lower wall 44a, the right wall 44c, the left wall 44d, and the upper wall 44e. The grass-collecting space 60 communicates with the outside of the grass collection box 44 through the openings 46, 48. The discharging part 61 is disposed behind the grass collection part 59. The discharging part 61 has a discharging space 62 therein. The discharging space 62 is defined by the inner wall 54, the rear wall 44b, the right wall 44c, the left wall 44d, and the upper wall 44e. The discharging space 62 is disposed rearward of the grass-collecting space 60. The discharging space 62 communicates with the grass-collecting space 60, and communicates with the outside of the grass collection box 44 through the opening 50.

The adjustment mechanism 56 includes a direction adjustment member 70 and a velocity adjustment member 72. The direction adjustment member 70 is disposed inside the grass-collecting space 60. The direction adjustment member 70 is fixed to the upper wall 44e using screws 74. The screws 74 are inserted into holes 76 defined in the upper wall 44e. The holes 76 are arranged with intervals in the front-rear direction. By changing the holes 76 into which the screws 74 are to be inserted, a position of the direction adjustment member 70 in the front-rear direction is adjusted. In the state where the direction adjustment member 70 is fixed to the upper wall 44e, the direction adjustment member 70 extends substantially forward along the upper wall 44e, bends, and extends toward the lower wall 44a. The lower end of the direction adjustment member 70 is disposed closer to the lower wall 44a than the upper end of the inner wall 54 is. Although not shown, the direction adjustment member 70 extends in the left-right direction.

The velocity adjustment member 72 is disposed inside the grass-collecting space 60. The velocity adjustment member 72 is disposed at a rear upper portion of the grass collection part 59. The velocity adjustment member 72 is disposed closer to the inner wall 54 than the direction adjustment member 70 is. The velocity adjustment member 72 is supported by the upper wall 44e so as to be pivotable about a pivot axis extending in the left-right direction. When the velocity adjustment member 72 is in a non-pivot state, the velocity adjustment member 72 extends rearward and downward from the upper wall 44e, bends, and further extends to the upper end of the inner wall 54. When the velocity adjustment member 72 is in the non-pivot state, the velocity adjustment member 72 abuts the upper end of the inner wall 54 or its vicinity from the front side. Due to this, when the velocity adjustment member 72 is in the non-pivot state, the grass-collecting space 60 and the discharging space 62 do not communicate. When the velocity adjustment member 72 pivots forward from the non-pivot state, the velocity adjustment member 72 approaches closer to the upper wall 44e and moves away from the inner wall 54. Due to this, an opening 58 is thereby created between the velocity adjustment member 72 and the inner wall 54. Further, the grass-collecting space 60 and the discharging space 62 thereby communicate. As the velocity adjustment member 72 pivots forward, an opening area of the opening 58 increases.

As shown in FIG. 4, the lever 82 is disposed on the rear right side of the upper wall 44e. As shown in FIG. 5, the lever 82 is pivotably supported by the upper wall 44e. The lever 82 is configured to be operated by the worker. When the lever 82 pivots, the velocity adjustment member 72 pivots therewith. For example, when the lever 82 is moved rearward by the worker when the velocity adjustment member 72 is in the non-pivot state, the velocity adjustment member 72 pivots forward and moves away from the inner wall 54. The lever 82 can be fixed at a desired position. Due to this, the velocity adjustment member 72 can be fixed at a desired pivot angle, and the opening area of the opening 58 can be adjusted to a desired size.

Next, series of grass-cutting operation using the lawn mower 2 will be described. When the blade motor 26 shown in FIG. 2 is driven, the blade 16 and the fan 18 rotate with the rotation of the rotation shaft 14. When the blade 16 rotates, the grass on the ground is thereby cut. The grass cut by the blade 16 includes heavy grass L1 cut long (see FIG. 6) and light grass L2 cut short (see FIG. 6). Further, when the fan 18 rotates, an air flow from the opening at the lower surface of the deck 12 toward the duct 20 (see FIG. 3) is generated in the space inside the deck 12. Due to this, the heavy grass L1 and the light grass L2 are suctioned by the fan 18 and are sent into the grass collection unit 6 through the duct 20.

Figure 6:
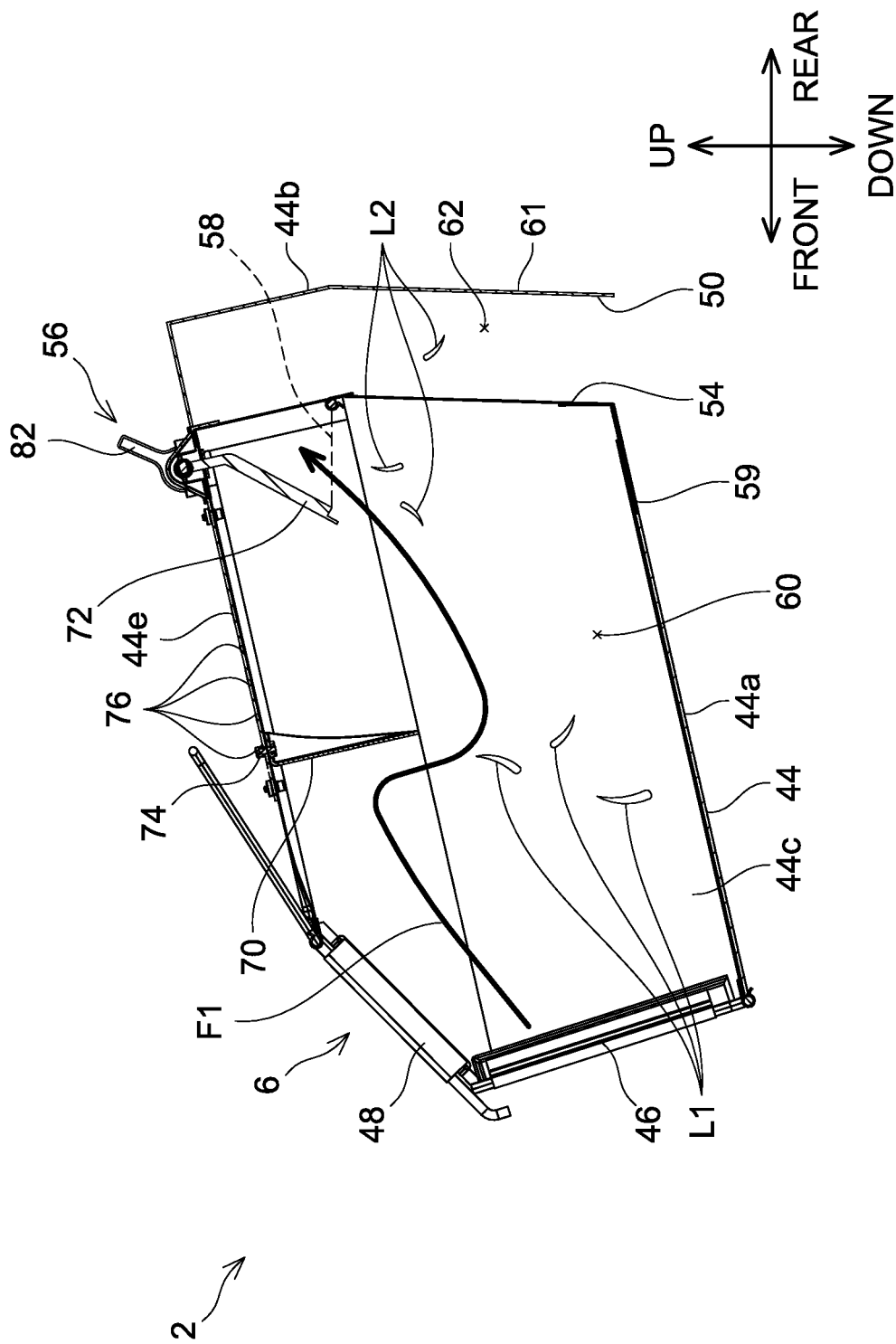
FIG. 6 is a vertical cross-sectional view of the grass collection unit 6 of the lawn mower 2 of the first embodiment, when a direction adjustment member 70 is located on the front side and the velocity adjustment member 72 is in a pivot state.

As shown in FIG. 6, the heavy grass L1 and the light grass L2 flow into the grass collection box 44 from the opening 46 along the air flow generated by the rotation of the fan 18. After this, the heavy grass L1 and the light grass L2 flow inside the grass collection box 44 along the air flow F1. In FIG. 6, the air flow F1 within the grass collection box 44 is shown by a solid line. Firstly, the air flow F1 will be described. The air that entered into the grass-collecting space 60 from the opening 46 flows rearward and upward and reaches the direction adjustment member 70. After this, the air meanders around the direction adjustment member 70 and flows toward the opening 58. Specifically, the air flowing toward the opening 58 is disturbed by the direction adjustment member 70, by which the air collides with the direction adjustment member 70 and flows along the direction adjustment member 70 toward the lower end of the direction adjustment member 70. The air that reached the lower end of the direction adjustment member 70 changes its flowing direction after having passed by the direction adjustment member 70, and flows toward the opening 58. After this, the air passes through the opening 58 between the velocity adjustment member 72 and the inner wall 54 and flows from the grass-collecting space 60 into the discharging space 62. The air having entered therein flows in the discharging space 62 toward the opening 50, and flows out to the outside of the grass collection box 44 from the opening 50.

Next, flows of the heavy grass L1 and the light grass L2 will be described. Firstly, the heavy grass L1 and the light grass L2 having entered the grass-collecting space 60 from the opening 46 flow to the direction adjustment member 70 along with the air flow F1. In this case, since the heavy grass L1 has a higher weight as compared to the light grass L2, the heavy grass L1 drops out from the air flow F1 before coming close to the direction adjustment member 70, and falls toward the lower wall 44a of the grass collection box 44 by its own weight. Due to this, the heavy grass L1 is collected in the grass-collecting space 60. Further, as aforementioned, the air flow F1 meanders around the direction adjustment member 70 when it comes close to the direction adjustment member 70. In this case, the heavy grass L1 drops out from the meandering air flow F1 and is collected in the grass-collecting space 60. Further, the heavy grass L1 drops out from the meandering air flow F1 by colliding with the direction adjustment member 70, and is thereby collected in the grass-collecting space 60. On the other hand, the light grass L2 can flow along the direction adjustment member 70 with the meandering air flow F1 even if the air flow F1 meanders around the direction adjustment member 70, thus it passes by the lower end of the direction adjustment member 70 and reaches the opening 58. After this, the light grass L2 flows through the opening 58 from the grass-collecting space 60 into the discharging space 62. The light grass L2 having entered the discharging space 62 flows out of the grass collection box 44 through the opening 50. Due to this, the light grass L2 is scattered on the ground. As a result, among the heavy grass L1 and the light grass L2 cut by the blade 16, the heavy grass L1 is collected in the grass-collecting space 60, as a result of which a frequency of work to throw out the grass collected in the grass collection box 44 can be reduced.

Figure 7:
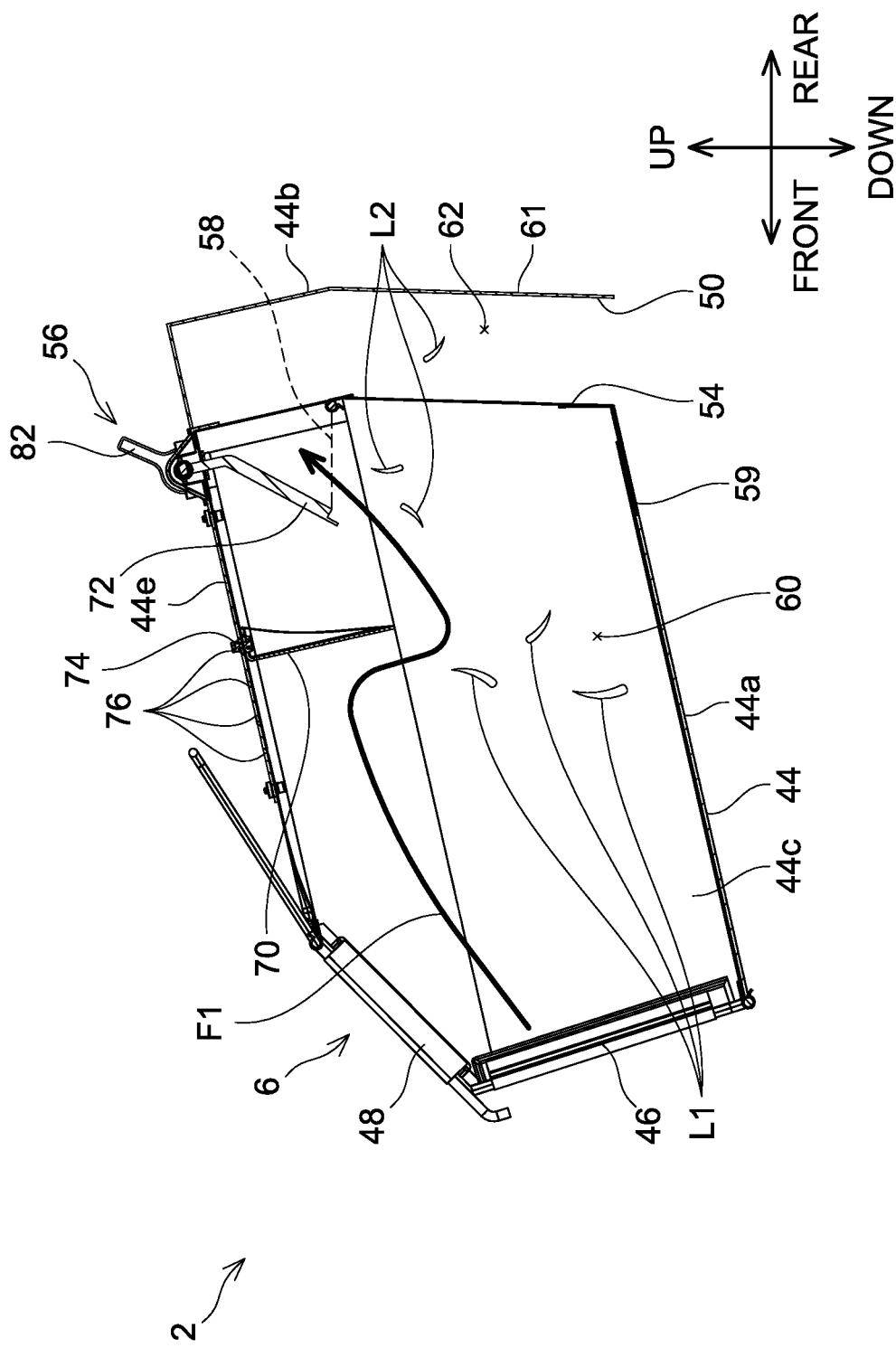
FIG. 7 is a vertical cross-sectional view of the grass collection unit 6 of the lawn mower 2 of the first embodiment, when the direction adjustment member 70 is located on the rear side and the velocity adjustment member 72 is in the pivot state.

In the present embodiment, a direction of the air flow F1 changes by adjusting the position of the direction adjustment member 70 with respect to a direction from the opening 46 toward opening 58. As the direction adjustment member 70 moves from the position closest to the opening 46 as shown in FIG. 6 to the position separated farthest from the opening 46 as shown in FIG. 7 (that is, the position closest to the opening 58), the air flows around the direction adjustment member 70 and thus thereby meanders significantly. Specifically, when the air flowing along the direction adjustment member 70 flows beyond the lower end of the direction adjustment member 70 toward the opening 58, change in the direction of the air flow F1 becomes more drastic. When the change in the direction of the air flow F1 becomes more drastic, the heavy grass L1 can more easily dropout from the meandering air flow F1. Due to this, the heavy grass L1 can more easily fall toward the lower wall 44a by its own weight, and thus can more easily be collected in the grass-collecting space 60. On the other hand, even when the change in the direction of the air flow F1 becomes drastic, the light grass L2 can flow along with the meandering air flow F1. Thus, the light grass L2 can flow to the opening 58 and flow out to the outside of the grass collection box 44 through the opening 50.

Further, the air flow F1 changes by adjusting the pivot angle of the velocity adjustment member 72. As the velocity adjustment member 72 pivots from the state where the velocity adjustment member 72 pivots as shown in FIG. 6 to the state where the velocity adjustment member 72 is in the non-pivot state as shown in FIG. 5, the opening area of the opening 58 decreases. Due to this, velocity of the air flowing toward the opening 58 decreases. As the velocity of the air flowing toward the opening 58 decreases, the heavy grass L1 can more easily drop out from the air flow F1 having the reduced velocity, thus it becomes easier for the heavy grass L1 to fall toward the lower wall 44a by its own weight, and thus is more easily collected in the grass-collecting space 60. On the other hand, even when the velocity of the air flowing toward the opening 58 decreases, the light grass L2 can flow along with the air flow F1 having the reduced velocity, thus the light grass L2 can flow to the opening 58 and flow out to the outside of the grass collection box 44 through the opening 50.

(Effect)

The lawn mower 2 of the present embodiment comprises the blade 16 configured to cut the grass; the grass collection unit 6 configured to collect the grass cut by the blade 16; and the fan 18 configured to generate the air flow that blows the grass cut by the blade toward the grass collection unit 6. The grass includes the heavy grass L1 cut long by the blade 16 and the light grass L2 cut short by the blade 16. Among the heavy grass L1 and the light grass L2 having entered the grass collection unit 6, the grass collection unit 6 is configured to collect the heavy grass L1 and discharge the light grass L2 out of the grass collection unit 6. In the above configuration, firstly, both the heavy grass L1 and the light grass L2 cut by the blade 16 enter the grass collection unit 6. After that, only the heavy grass L1 is collected in the grass collection unit 6, while the light grass L2 flows within the grass collection unit 6 and is thereafter discharged out of the grass collection unit 6. Due to this, the grass can be separated into the heavy grass L1 and the light grass L2, as a result of which the heavy grass can be collected and the light grass can be discharged.

As shown in FIG. 6, the grass collection unit 6 comprises: the grass collection part 59 configured to collect the grass and comprising the opening 46 and the opening 58; and the adjustment mechanism 56 disposed inside the grass collection part 59 and configured to adjust the air flow F1 having entered the grass collection part 59 from the opening 46. By the adjustment mechanism 56 adjusting the air flow F1 having entered the grass collection part 59 from the opening 46, the heavy grass L1 is collected in the grass collection part 59 and the light grass L2 is discharged out of the grass collection part 59 from the opening 58. In the above configuration, by adjusting the air flow F1 using the adjustment mechanism 56, the heavy grass L1 can be collected in the grass collection part 59 while the light grass L2 is discharged out of the grass collection part 59 through the opening 58 by using a weight difference between the heavy grass L1 and the light grass L2. Due to this, the grass can be separated into the heavy grass L1 and the light grass L2, and further, the heavy grass can be collected while the light grass is discharged.

The adjustment mechanism 56 comprises the velocity adjustment member 72. The velocity adjustment member 72 is configured to adjust velocity of the air flow from the opening 46 toward the opening 58 by adjusting the opening area of the opening 58. When the velocity of the air flow from the opening 46 toward the opening 58 is decreased within the grass collection part 59 (i.e., the grass-collecting space 60), the light grass L2 will flow to the opening 58 along with the air flow F1, while the heavy grass L1 is more likely to drop out from the air flow F1 and be collected in the grass collection part 59. In the above configuration, by adjusting the opening area of the opening 58 using the velocity adjustment member 72, the velocity of the air flow from the opening 46 toward the opening 58 can be adjusted. Due to this, the grass can be separated into the heavy grass L1 and the light grass L2, and further the heavy grass can be collected while the light grass is discharged.

The velocity adjustment member 72 is pivotably supported by the grass collection part 59. The opening area of the opening 58 changes as the pivot angle of the velocity adjustment member 72 changes. In the above configuration, the opening area of the opening 58 can be adjusted with a simple configuration.

The adjustment mechanism 56 comprises the direction adjustment member 70. The direction adjustment member 70 is disposed between the opening 46 and the opening 58, and the direction adjustment member 70 is configured to adjust the direction of the air flow F1 from the opening 46 toward the opening 58 by disturbing the air flow F1 from the opening 46 toward the opening 58. When the air flow D1 from the opening 46 toward the opening 58 meander within the grass collection part 59 (i.e., the grass-collecting space 60), the light grass L2 will flow to the opening 58 along with the air flow F1, while the heavy grass L1 is more likely to drop out from the air flow F1 and be collected in the grass-collecting space 60. In the above configuration, the direction of the air flow F1 from the opening 46 toward the opening 58 can be adjusted by disturbing the air flow from the opening 46 toward the opening 58 by using the direction adjustment member 70. Due to this, the grass can be separated into the heavy grass L1 and the light grass L2, and further the heavy grass can be collected while the light grass is discharged.

The direction adjustment member 70 is supported by the grass collection part 59. The direction adjustment member 70 is configured such that the position of the direction adjustment member 70 is adjustable with respect to the direction from the opening 46 toward the opening 58. The direction of the air flow F1 from the opening 46 toward the opening 58 changes as the position of the direction adjustment member 70 changes. In the above configuration, the direction of the air flow F1 from the opening 46 toward the opening 58 can be adjusted with a simple configuration.

The lawn mower 2 further comprises the blade motor 26 configured to rotate the blade 16 and the fan 18. In the above configuration, the blade 16 and the fan 18 are both driven by the same blade motor 26. The lawn mower 2 can be made more compact as compared to a case where a motor for driving the blade 16 and a motor for driving the fan 18 are separately provided.

The blade 16 and the fan 18 share the rotation shaft 14. Since the blade 16 and the fan 18 share the rotation shaft 14, the lawn mower can be made more compact as compared to a case where the rotation shaft of the blade 16 and the rotation shaft of the fan 18 are separately provided.

The blade 16 and the fan 18 are integrally formed. In the above configuration, the number of components constituting the lawn mower 2 can be reduced.

The blade motor 26 functions as a prime mover. In the above configuration, vibration and noise generated upon using the lawn mower 2 can be reduced as compared to a case where the prime mover is an engine.

The lawn mower 2 further comprises the battery packs B configured to supply electric power to the blade motor 26. When the lawn mower 2 is configured to supply electric power from an external power source to the blade motor 26 through a power cable, the power cable may interfere with grass-cutting work. In the above configuration, work efficiency in using the lawn mower 2 can be improved.
(Corresponding Relationship)

The opening 46 is an example of "collection inlet", the opening 58 is an example of "discharge outlet", and the blade motor 26 is an example of "prime mover".

Second Embodiment

Figure 8:
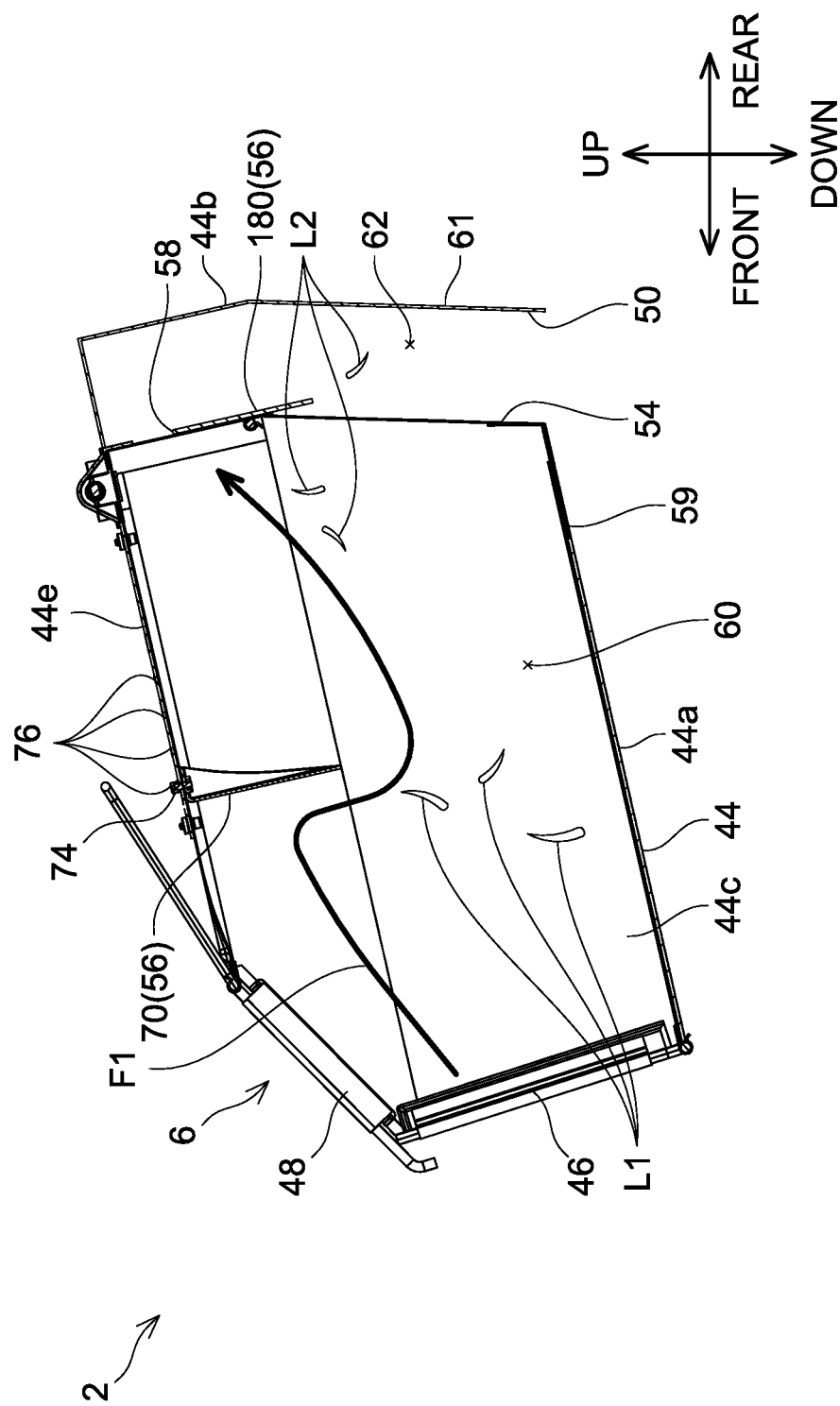
FIG. 8 is a vertical cross-sectional view of a grass collection unit 6 of a lawn mower 2 of a second embodiment.

A second embodiment will be described with reference to FIG. 8. In the second embedment, only the features different from the first embodiment will be described, and the features that are the same as those of the first embodiment will be given the same reference signs and the description thereof will be omitted. In the second embodiment, the configuration of a velocity adjustment member 180 is different from the configuration of the velocity adjustment member 72 of the first embodiment. The velocity adjustment member 180 is disposed inside the discharging space 62. The velocity adjustment member 180 is slidably supported by the right wall 44c and the left wall 44d of the grass collection box 44. The velocity adjustment member 180 is configured to slide in a direction perpendicular to the upper wall 44e. The velocity adjustment member 180 is disposed behind and adjacent to the inner wall 54. In the state where the velocity adjustment member 180 is in a non-slide state, the upper end of the velocity adjustment member 180 abuts the upper wall 44e. Due to this, the grass-collecting space 60 and the discharging space 62 do not communicate when the velocity adjustment member 180 is in the non-slide state. When the velocity adjustment member 180 slides substantially downward from the non-slide state, it moves away from the upper wall 44e. Due to this, the opening 58 is created between the upper end of the velocity adjustment member 180 and the upper wall 44e. Further, the grass-collecting space 60 and the discharging space 62 thereby communicate. As the velocity adjustment member 180 slides substantially downward, the opening area of the opening 58 increases. The velocity adjustment member 180 slides when levers (not shown) disposed on the right wall 44c and the left wall 44d are operated.

As the velocity adjustment member 180 slides toward the upper wall 44e, the opening area of the opening 58 decreases. Due to this, the velocity of the air flowing toward the opening 58 decreases. As the velocity of the air flowing toward the opening 58 decreases, the heavy grass L1 can more easily drop out from the air flow F1 having the reduced velocity, thus it becomes easier for the heavy grass L1 to fall toward the lower wall 44a by its own weight, and thus to be collected in the grass-collecting space 60. On the other hand, even when the velocity of the air flowing toward the opening 58 decreases, the light grass L2 can flow along with the air flow F1 having the reduced velocity, thus the light grass L2 can flow to the opening 58 and flow out to the outside of the grass collection box 44 through the opening 50.
(Effect)

In the lawn mower 2 of the present embodiment, the velocity adjustment member 180 is slidably supported by the grass collection part 59. The opening area of the opening 58 changes as an amount of sliding of the velocity adjustment member 180 changes. In the above configuration, the opening area of the opening 58 can be adjusted with a simple configuration.

Third Embodiment

Figure 9:
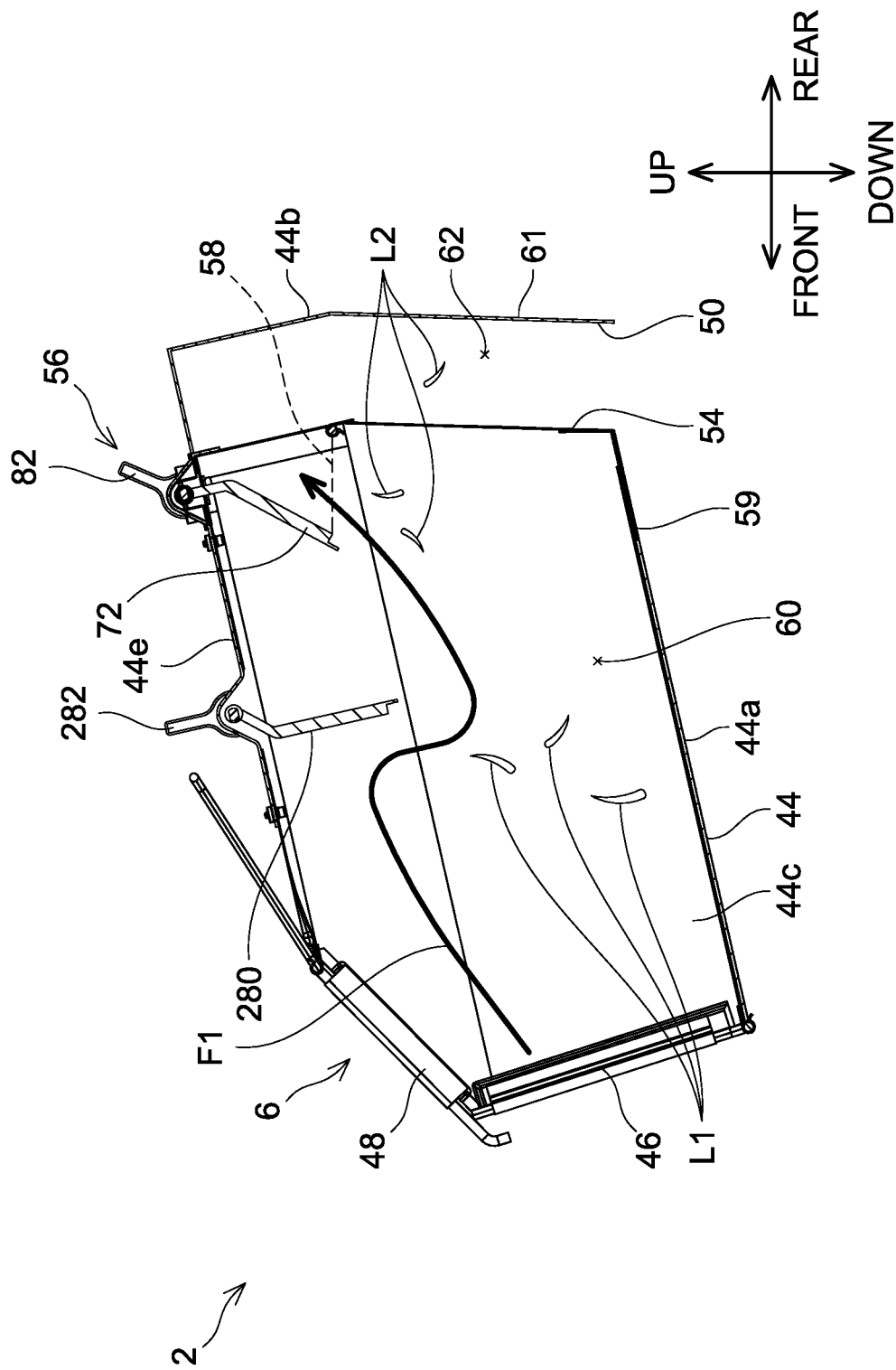
FIG. 9 is a vertical cross-sectional view of a grass collection unit 6 of a lawn mower 2 of a third embodiment, when a direction adjustment member 280 is in a non-pivot state.
Figure 10:
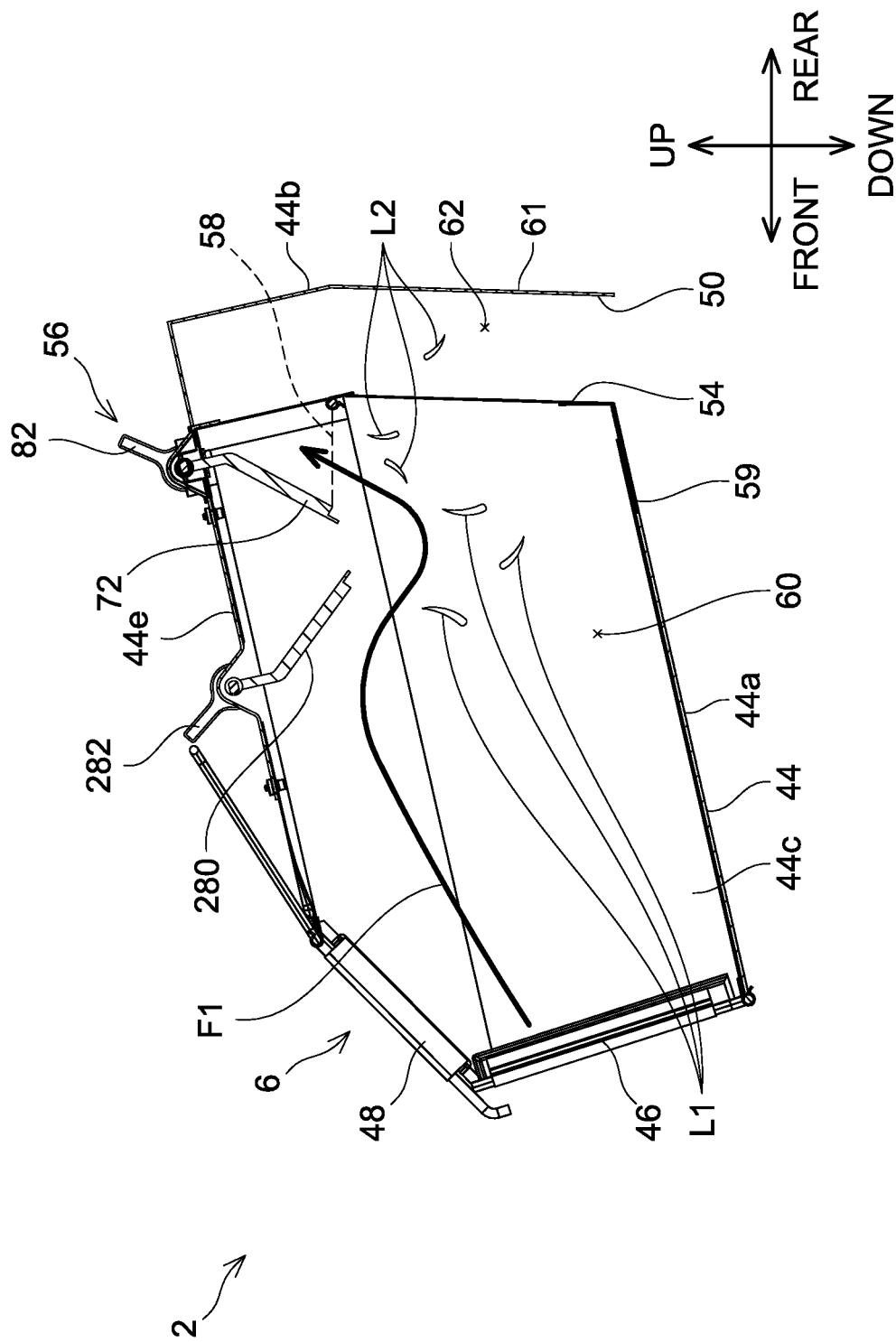
FIG. 10 is a vertical cross-sectional view of the grass collection unit 6 of the lawn mower 2 of the third embodiment, when the direction adjustment member 280 is in a pivot state.

A third embodiment will be described with reference to FIGS. 9 and 10. In the third embedment, only the features different from the first embodiment will be described, and the features that are the same as those of the first embodiment will be given the same reference signs and the description thereof will be omitted. In the third embodiment, the configuration of a direction adjustment member 280 is different from the configuration of the direction adjustment member 70 of the first embodiment. The direction adjustment member 280 is supported by the upper wall 44e so as to be pivotable about a pivot axis extending in the left-right direction. The direction adjustment member 280 is configured to pivot in a direction toward the velocity adjustment member 72. As shown in FIG. 9, when the direction adjustment member 280 is in a non-pivot state, the direction adjustment member 280 extends frontward and downward from the upper wall 44e, bends, and further extends toward the lower wall 44a in the direction perpendicular to the upper wall 44e. As the direction adjustment member 280 pivots in the direction toward the velocity adjustment member 72 from the non-pivot state, the direction adjustment member 280 tilts with respect to the upper wall 44e.

The grass collection unit 6 further includes a lever 282. The lever 282 is pivotably supported by the upper wall 44e. The lever 282 is disposed frontward of the lever 82. The lever 282 is configured to be operated by the worker. When the lever 282 pivots, the direction adjustment member 280 pivots therewith. For example, when the lever 282 is moved forward by the worker when the direction adjustment member 280 is in the non-pivot state, the direction adjustment member 280 pivots in the direction toward the velocity adjustment member 72.

Next, the air flow F1 will be described. As the direction adjustment member 280 pivots from a state where the direction adjustment member 280 pivots as shown in FIG. 10 to the state where the direction adjustment member 280 is in the non-pivot state as shown in FIG. 9, the air flows around the direction adjustment member 280 and meanders significantly. Specifically, when the air flowing along the direction adjustment member 280 flows beyond the lower end of the direction adjustment member 280 toward the opening 58, the change in the direction of the air flow F1 becomes more drastic. When the change in the direction of the air flow F1 becomes more drastic, the heavy grass L1 can more easily dropout from the meandering air flow F1. Due to this, the heavy grass L1 can more easily fall toward the lower wall 44a by its own weight, and thus can more easily be collected in the grass-collecting space 60. On the other hand, even when the change in the direction of the air flow F1 becomes drastic, the light grass L2 can flow along with the meandering air flow F1. Thus, the light grass L2 can flow to the opening 58 and flow out to the outside of the grass collection box 44 through the opening 50.

(Effect)

In the lawn mower 2 of the present embodiment, the direction adjustment member 280 is pivotably supported by the grass collection part 59. The direction of the air flow from the opening 46 toward the opening 58 may change as a pivot angle of the direction adjustment member 280 changes. In the above configuration, the direction of the air flow F1 from the opening 46 toward the opening 48 can be adjusted with a simple configuration.

Fourth Embodiment

Figure 11:
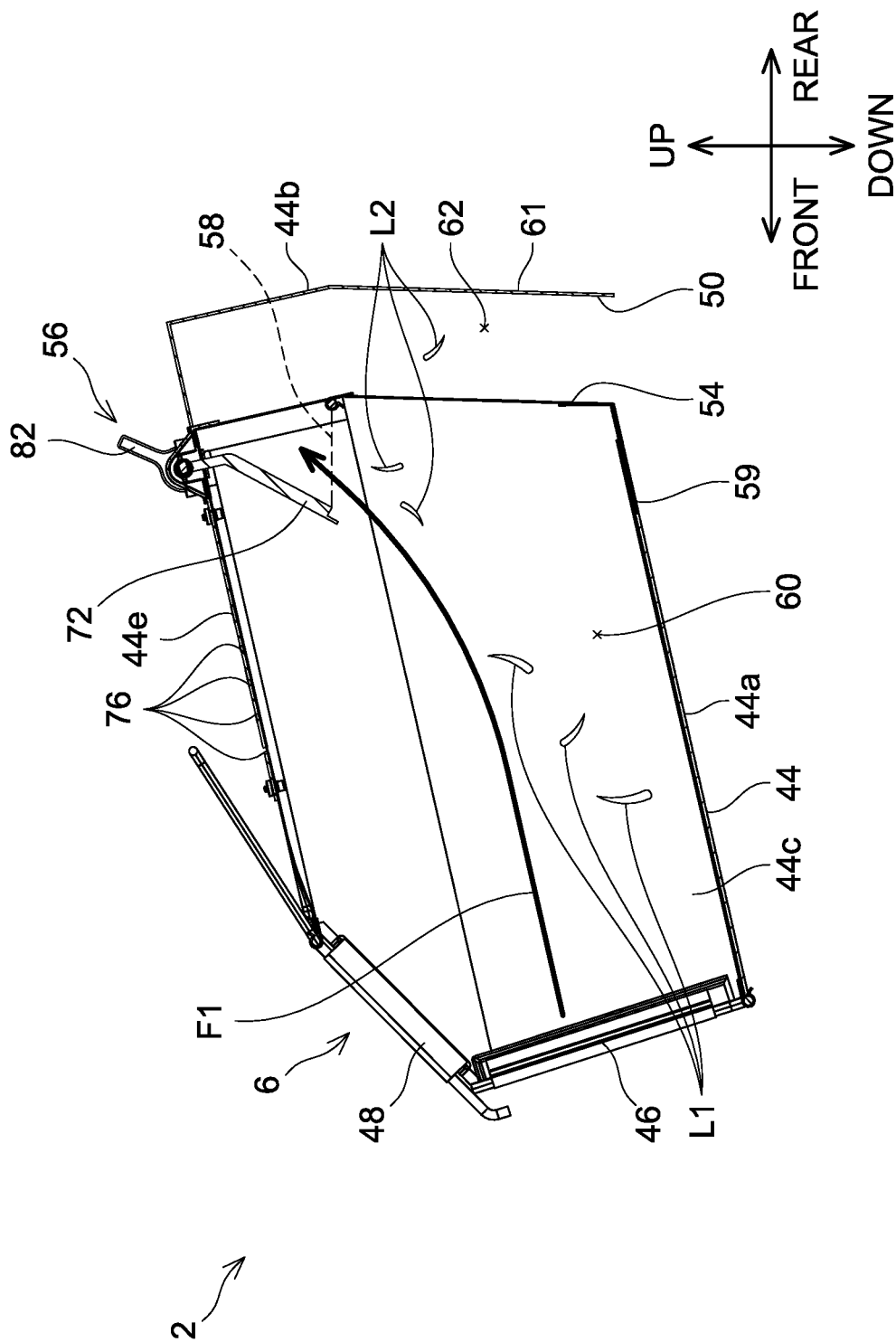
FIG. 11 is a vertical cross-sectional view of a grass collection unit 6 of a lawn mower 2 of a fourth embodiment, when a velocity adjustment member 72 is in a pivot state.

A fourth embodiment will be described with reference to FIG. 11. In the fourth embedment, only the features different from the first embodiment will be described, and the features that are the same as those of the first embodiment will be given the same reference signs and the description thereof will be omitted. In the fourth embodiment, the adjustment mechanism 56 does not include the direction adjustment member 70 of the first embodiment, and includes only the velocity adjustment member 72. Since the adjustment mechanism 56 does not have the direction adjustment member 70, the direction of the air flow F1 within the grass-collecting space 60 does not change drastically, and the air flows toward the opening 58. In this case, since the heavy grass L1 has a higher weight as compared to the light grass L2, the heavy grass L1 drops out from the air flow F1 and falls toward the lower wall 44a of the grass collection box 44 by its own weight. Due to this, the heavy grass L1 is collected in the grass-collecting space 60. The air flowing toward the opening 58 passes through the opening 58 between the velocity adjustment member 72 and the inner wall 54, and flows from the grass-collecting space 60 into the discharging space 62. The air having entered the discharging space 62 flows therein toward the opening 50, and flows out to the outside of the grass collection box 44 from the opening 50. The light grass L2 flows out of the grass collection box 44 from the opening 50 along with the air.

The adjustment mechanism 56 according to an embodiment may include only the direction adjustment member 70 or 280.

The lawn mower 2 according to an embodiment may include an engine configured to drive the blade 16 and the fan 18 as a substitute to the blade motor 26.

The lawn mower 2 according to an embodiment may include a power cable for supplying electric power from an external power source to the blade motor 26 as a substitute to the battery packs B.

The direction adjustment member 70 according to an embodiment may be supported by the upper wall 44e so as to be slidable in a direction from the opening 46 toward the opening 58.

The blade 16 and the fan 18 according to an embodiment may be separate members.

What is claimed is:

1. A lawn mower comprising:
    a blade configured to cut grass;
    a grass collection unit configured to collect the grass cut by the blade; and
    a fan configured to generate an air flow that blows the grass cut by the blade toward the grass collection unit, wherein,
    the grass collection unit comprises:
        a grass collection part configured to collect the grass and comprising a collection inlet and a discharge outlet; and
        an adjustment mechanism disposed inside the grass collection part and configured to adjust the air flow having entered the grass collection part from the collection inlet,
    the adjustment mechanism comprises a velocity adjustment member,
    the velocity adjustment member is configured to adjust velocity of the air flow from the collection inlet toward the discharge outlet by adjusting an opening area of the discharge outlet,
    the grass includes heavy grass cut long by the blade and light grass cut short by the blade,
    among the heavy grass and the light grass having entered the grass collection unit, the grass collection unit is configured to collect the heavy grass and discharge the light grass out of the grass collection unit, and
    by the adjustment mechanism adjusting the air flow having entered the grass collection part from the collection inlet, the heavy grass is collected in the grass collection part and the light grass is discharged out of the grass collection part from the discharge outlet.

2. The lawn mower according to claim 1, wherein
    the velocity adjustment member is pivotably supported by the grass collection part, and
    the opening area of the discharge outlet changes as a pivot angle of the velocity adjustment member changes.

3. The lawn mower according to claim 1, wherein
    the velocity adjustment member is slidably supported by the grass collection part, and
    the opening area of the discharge outlet changes as an amount of sliding of the velocity adjustment member changes.

4. The lawn mower according to claim 1, wherein
    the adjustment mechanism comprises a direction adjustment member, the direction adjustment member is disposed between the collection inlet and the discharge outlet, and the direction adjustment member is configured to adjust a direction of the air flow from the collection inlet toward the discharge outlet by disturbing the air flow from the collection inlet toward the discharge outlet.

5. The lawn mower according to claim 4, wherein the direction adjustment member is pivotably supported by the grass collection part, and the direction of the air flow from the collection inlet toward the discharge outlet changes as a pivot angle of the direction adjustment member changes.

6. The lawn mower according to claim 4, wherein the direction adjustment member is supported by the grass collection part, the direction adjustment member is configured such that a position of the direction adjustment member is adjustable with respect to a direction from the collection inlet toward the discharge outlet, and the direction of the air flow from the collection inlet toward the discharge outlet changes as the position of the direction adjustment member changes.

7. The lawn mower according to claim 1, further comprising a prime mover configured to rotate the blade and the fan.

8. The lawn mower according to claim 7, wherein the blade and the fan share a rotation shaft.

9. The lawn mower according to claim 8, wherein the blade and the fan are integrally formed.

10. The lawn mower according to claim 7, wherein the prime mover is an electric motor.

11. The lawn mower according to claim 10, further comprising a battery pack configured to supply electric power to the prime mover.

12. The lawn mower according to claim 1, wherein the velocity adjustment member is pivotably or slidably supported by the grass collection part, the opening area of the discharge outlet changes as a pivot angle of the velocity adjustment member changes or an amount of sliding of the velocity adjustment member changes the adjustment mechanism comprises a direction adjustment member, the direction adjustment member is disposed between the collection inlet and the discharge outlet, the direction adjustment member is configured to adjust a direction of the air flow from the collection inlet toward the discharge outlet by disturbing the air flow from the collection inlet toward the discharge outlet, the direction adjustment member is supported by the grass collection part such that:

(i) the direction adjustment member is pivotable and the direction of the air flow from the collection inlet toward the discharge outlet changes as a pivot angle of the direction adjustment member changes; or (ii) a position of the direction adjustment member is adjustable with respect to a direction from the collection inlet toward the discharge outlet and the direction of the air flow from the collection inlet toward the discharge outlet changes as the position of the direction adjustment member changes, the lawn mower further comprises:

an electric motor configured to rotate the blade and the fan; and a battery pack configured to supply electric power to the electric motor, the blade and the fan share a rotation shaft, and the blade and the fan are integrally formed.

* * * * *